United States Patent [19]

Friedmann

[11] Patent Number: 4,611,701

[45] Date of Patent: Sep. 16, 1986

[54] TORSION DAMPING ASSEMBLY FOR USE IN MOTOR VEHICLES

[75] Inventor: Oswald Friedmann, Lichtenau, Fed. Rep. of Germany

[73] Assignee: LuK Lamellen und Kupplungsbau GmbH, Buhl, Fed. Rep. of Germany

[21] Appl. No.: 706,498

[22] Filed: Feb. 28, 1985

[30] Foreign Application Priority Data

Mar. 5, 1984 [DE] Fed. Rep. of Germany ....... 3408069
Jun. 12, 1984 [DE] Fed. Rep. of Germany ....... 3421698

[51] Int. Cl.<sup>4</sup> ............................................. F16D 13/70
[52] U.S. Cl. ............................. 192/110 B; 192/70.18
[58] Field of Search .............. 192/70.17, 70.18, 106.1, 192/106.2, 110 B, 110 R; 384/517

[56] References Cited

U.S. PATENT DOCUMENTS 3,776,337 12/1973 Yoshizawa ...................... 192/110 B
4,002,043 1/1977 Yoshida .
4,274,524 6/1981 Nakawe ............................ 192/48.3
4,364,615 12/1982 Euler .................................. 384/517

FOREIGN PATENT DOCUMENTS 0049805 9/1981 European Pat. Off. .

Primary Examiner—George H. Krizmanich
Attorney, Agent, or Firm—Peter K. Kontler

[57] ABSTRACT

A torsion damping assembly which is installed in a motor vehicle between the crankshaft of the internal combustion engine and the input shaft of the change-speed transmission has two coaxial flywheels one of which receives torque from the crankshaft and is rotatable, within limits, relative to the other flywheel which transmits torque to the input shaft of the transmission by way of a friction clutch. The flywheels are rotatable within limits relative to each other against the opposition of a damper and about the axis of a self-aligning or self-adjusting antifriction bearing one race of which is biased axially by a diaphragm spring reacting against the one or the other flywheel. The antifriction bearing surrounds a centrally located protuberance of the one flywheel and extends into a centrally located recess of the other flywheel. Such bearing can stand long periods of use because it holds the flywheels against wobbling and/or other stray movements relative to each other.

24 Claims, 6 Drawing Figures

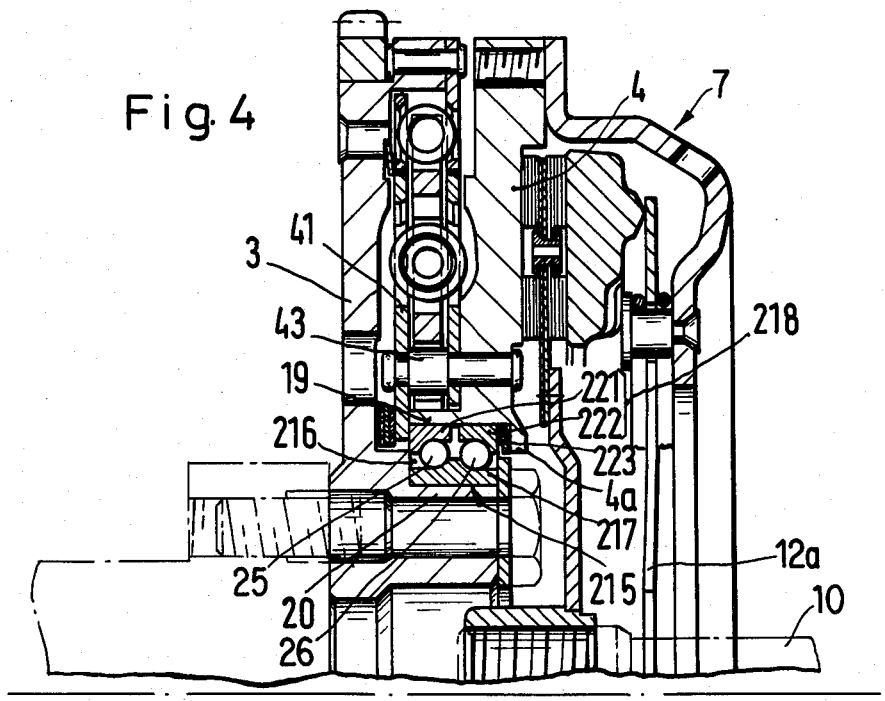
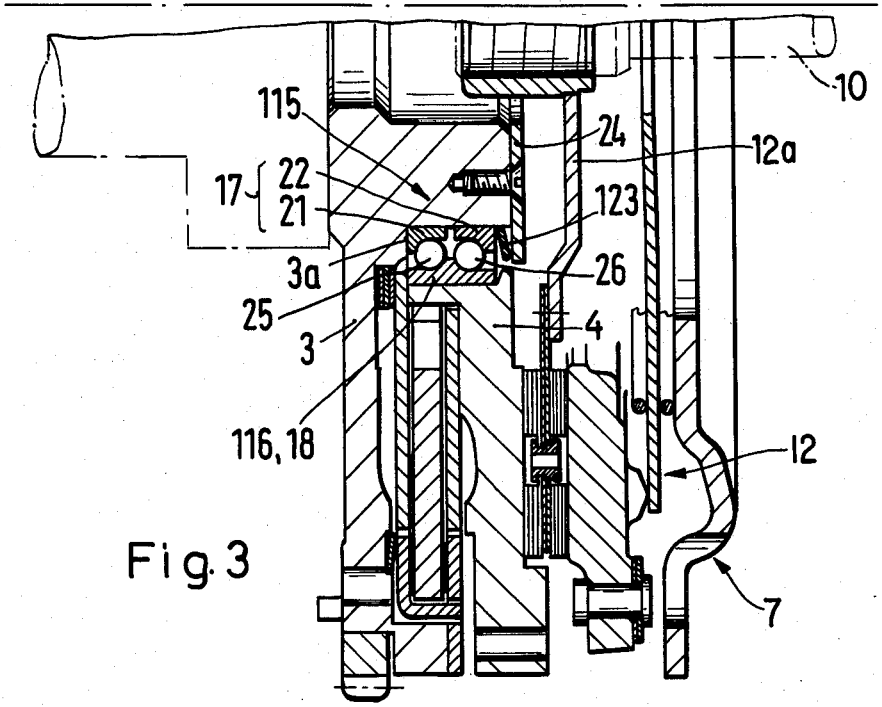

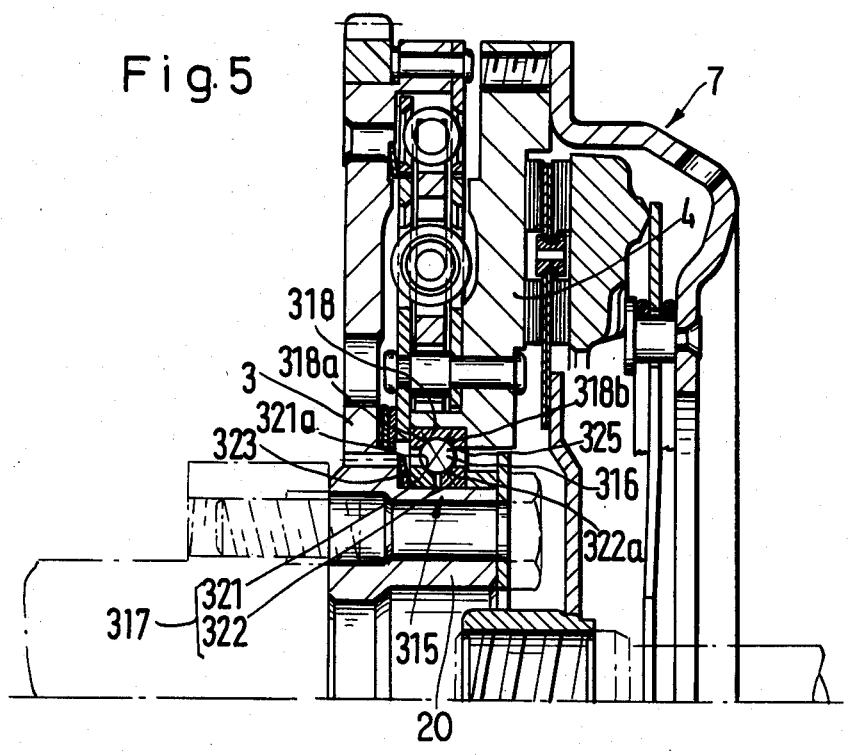
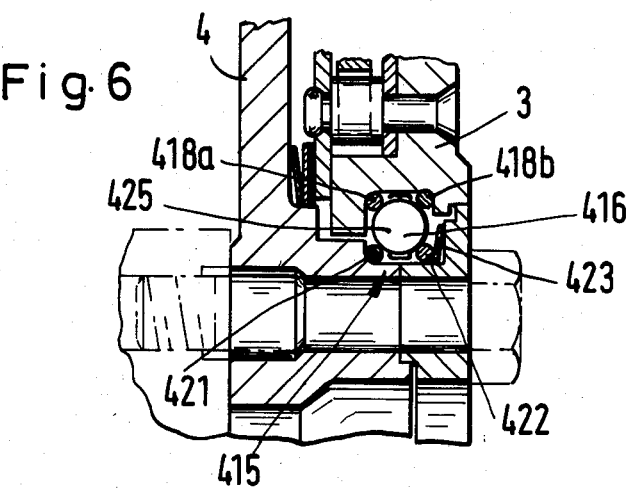

TORSION DAMPING ASSEMBLY FOR USE IN MOTOR VEHICLES

CROSS-REFERENCE TO RELATED CASES

The torsion damping assembly of the present invention is similar to that which is disclosed in the commonly owned copending patent application Ser. No. 669,768 filed Nov. 8, 1984 and in numerous other pending applications of the assignee.

BACKGROUND OF THE INVENTION

The present invention relates to torsion damping assemblies in general, and more particularly to improvements in assemblies which can be utilized in motor vehicles to compensate for fluctuations of torque which is transmitted between the crankshaft of the internal combustion engine and the input shaft of the change-speed transmission. Still more particularly, the invention relates to improvements in torsion damping assemblies of the type wherein several coaxial flywheels can rotate relative to each other within predetermined limits and against the opposition of one or more yieldable dampers. One of the flywheels can receive torque directly from the crankshaft of the engine and another flywheel can transmit torque to the input shaft of the transmission, preferably through the medium of a friction clutch.

It is already known to install between the aforementioned flywheels an antifraction bearing which centers of the flywheels and ensures that they rotate about a common axis, and to non-rotatably secure one race of the antifriction bearing to the other flywheel. In spite of their highly satisfactory damping characteristics, such assemblies failed to gain acceptance in the automotive and other industries even though they are (in many respects) ideally suited for the transmission of torque between the crankshaft of an internal combustion engine and the power train which transmits torque to the wheels of a motor vehicle. The primary reason for such lack of acceptance is that the useful life of the antifriction bearing between the flywheels is very short, i.e., the antifriction bearings constitute the critical elements of such damping assemblies because their useful life is much shorter than that of other component parts. The reasons for the short useful life of the antifriction bearings are numerous and they are attributable in part to pronounced fluctuations of the magnitude and/or direction of transmitted torque. Moreover, the races of the antifriction bearing between the flywheels can only perform rather limited angular movements relative to each other, i.e., the extent of such angular movement does not exceed the extent of maximum permissible angular movement of the flywheels relative to each other. This is particularly undesirable when a vehicle which embodies the torsion damping assembly is under load and causes the races of the antifriction bearing to perform low-amplitude but high-frequency angular movements relative to one another. The rolling elements (e.g., balls) between the races of the antifriction bearing then perform recurring and relatively short back-and-forth rolling movements with attendant pronounced wear upon the adjacent portions of the races. In other words, the wear is limited to relatively small portions of the races so that such portions of the races develop recesses for the adjacent portions of the rolling elements. The formation of such recesses is the first stage of rapid deterioration and ultimate destruction of the races. Furthermore, the rolling elements can cause flaking or chipping of the adjacent portions of the races, and the thus segregated fragments promote rapid destruction of the antifriction bearing. Still further, limited back-and-fourth movements of the rolling elements do not suffice to ensure adequate lubrication of the races and/or rolling elements.

OBJECTS AND SUMMARY OF THE INVENTION

An object of the invention is to provide a torsion damping assembly wherein the bearing device between the flywheels is constructed, assembled and mounted in such a way that it can stand long periods of intensive or less intensive as well as infrequent or frequent use.

Another object of the invention is to provide a relatively simple and inexpensive bearing device which can be used as a superior substitute for heretofore known bearing devices in torsion damping assemblies of the type wherein several flywheels can rotate within limits relative to one another.

A further object of the invention is to provide a novel and improved method of prolonging the useful life of the bearing device in a torsion damping assembly of the above outlined character.

An additional object of the invention is to provide a bearing device which reduces the likelihood of extensive and premature wear upon its races and/or rolling elements.

Another object of the invention is to provide novel and improved means for prolonging the useful life of an antifriction bearing in the above outlined torsion damping assembly.

A further object of the invention is to provide a bearing device which adequately centers the flywheels and compels them to rotate about a common axis irrespective of the extent of wear upon its component parts.

The invention is embodied in a torsion damping assembly which is particularly suited to take up and compensate for fluctuations in the transmission of torque between the internal combustion engine and the change-speed transmission of a motor vehicle. The assembly comprises a plurality of coaxial flywheels which are rotatable within limits relative to each other and include a first flywheel arranged to receive torque from the engine (e.g., from the crankshaft of the engine) and a second flywheel which serves to transmit torque to the input shaft of the change-speed transmission, damper means which yieldably oppose rotation of the first and second flywheels relative to each other, and a bearing device which is interposed between the first and second flywheels and includes at least one self-adjusting or self-aligning antifriction bearing, namely a bearing which is constructed and assembled in such a way that at least one of its parts is movable relative to the other parts in the axial direction of the flywheels to thereby compensate for machining tolerances, assembling tolerances, wear and/or other factors which tend to induce the flywheels to perform other than limited angular movements relative to one another. The antifriction bearing includes a plurality of coaxial races and the bearing device can further comprise means for biasing at least a portion of at least one of the races axially of the flywheels. The antifriction bearing further comprises at least one annulus of rolling elements (e.g., spherical rolling elements) which are disposed between the races, and the biasing means includes means (e.g., one or more diaphragm springs) for urging the aforementioned portion of the one race against the adjacent annulus of rolling elements. In accordance with one presently preferred embodiment of the invention, the antifriction bearing comprises several annuli of rolling elements and at least one of the races comprises several coaxial ring-shaped sections one of which constitutes the aforementioned portion of the one race and is biased axially against the adjacent annulus of rolling elements.

The one race can be surrounded by the other race (i.e., the one race can constitute the inner race of the antifriction bearing) and the biasing means can include resilient means for urging one section of the one race against the rolling elements. Alternatively, the one race can surround the other race (i.e., it can constitute the outer race of the antifriction bearing) and one of its sections is biased axially against the rolling elements to thus eliminate play between the parts of the antifriction bearing.

The antifriction bearing can include a wire bearing with an annulus of rolling elements, a first race including two coaxial rings in point contact with each of the rolling elements and a second race including two coaxial rings in point contact with the rolling elements. The bearing device preferably further comprises means for biasing at least one of the rings axially against the rolling elements. The one ring can form part of the first race which can constitute the inner race of the antifriction bearing (i.e., it can be surrounded by the other race). Alternatively, the one ring can form part of that (outer) race which surrounds the other race.

The antifriction bearing can include or constitute a so-called four-point bearing having a first race, a second race and an annulus of rolling elements between the two races. At least one of the races includes a plurality of coaxial ring-shaped sections and the bearing device preferably further comprises means for biasing one section of the one race axially toward the rolling elements. The one race can constitute an inner race (i.e., it can be surrounded by the other race) or it can constitute the outer race which surrounds the other race of the four-point bearing.

The antifriction bearing of the improved damping assembly can merely include at least one annulus of rolling elements, a first race for such rolling elements and a second race for the rolling elements. At least one of the races can be arranged to bear axially against the rolling elements to thereby urge the rolling elements against the other race without the utilization of discrete biasing means. The one race can surround or it can be surrounded by the other race.

The torsion damping assembly can further comprise a friction clutch which serves to transmit torque from the second flywheel to the transmission and is disengageable in response to the application of a force acting in a predetermined direction axially of the flywheels. The aforementioned means for biasing at least one portion of one race of the antifriction bearing can be constructed and mounted in such a way that it biases at least a portion of the one race axially in or counter to such predetermined direction, and the force which the biasing means applies to the aforementioned portion of the one race is or can be between one and three times the maximum force which is required to disengage the friction clutch.

That portion of the one race which is urged axially by the biasing means can be a press fit or a transition fit on or in one of the first and second flywheels. One of the flywheels (preferably the first flywheel) can be provided with a centrally located protuberance which faces away from the engine and is surrounded by the bearing device. Such protuberance can form an integral part of the one flywheel. The biasing means can include a diaphragm spring a first portion of which reacts against one of the flywheels and a second portion (such second portion is preferably located radially inwardly of the first portion) of which bears against the aforementioned portion or section of the one race to urge such portion of the one race against the rolling elements of the antifriction bearing. As mentioned above, the antifriction bearing can comprise several coaxial annuli of rolling elements and the one race is then preferably the inner race of the antifriction bearing (i.e., it is surrounded by the other race). Such inner race comprises several (e.g., two) coaxial ring-shaped sections one of which is biased by the second portion of the diaphragm spring. The outer race of the antifriction bearing can be installed in a centrally located recess of the other flywheel, preferably in the recess of the second flywheel which cooperates with or forms part of the friction clutch and serves to receive torque from the engine by way of the first flywheel.

The novel features which are considered as characteristic of the invention are set forth in particular in the appended claims. The improved torsion damping assembly itself, however, both as to its construction and its mode of operation, together with additional features and advantages thereof, will be best understood upon perusal of the following detailed description of certain specific ebodiments with reference to the accompanying drawing.

BRIEF DESCRIPTION OF THE DRAWING

FIG. 3 is a fragmentary axial sectional view of a torsion damping assembly with a diaphragm spring which acts upon the right-hand section of the split inner race of an antifriction bearing;

FIG. 4 is a fragmentary axial sectional view of a third torsion damping assembly with an antifriction bearing which includes a split outer race;

FIG. 5 is a fragmentary axial sectional view of a further torsion damping assembly wherein the bearing device between the two flywheels includes a four-point antifriction bearing; and FIG. 6 is a fragmentary axial sectional view of an additional torsion damping assembly wherein the bearing device between the flywheels includes a wire bearing.

DESCRIPTION OF THE PREFERRED EMBODIMENTS

Figure 1:
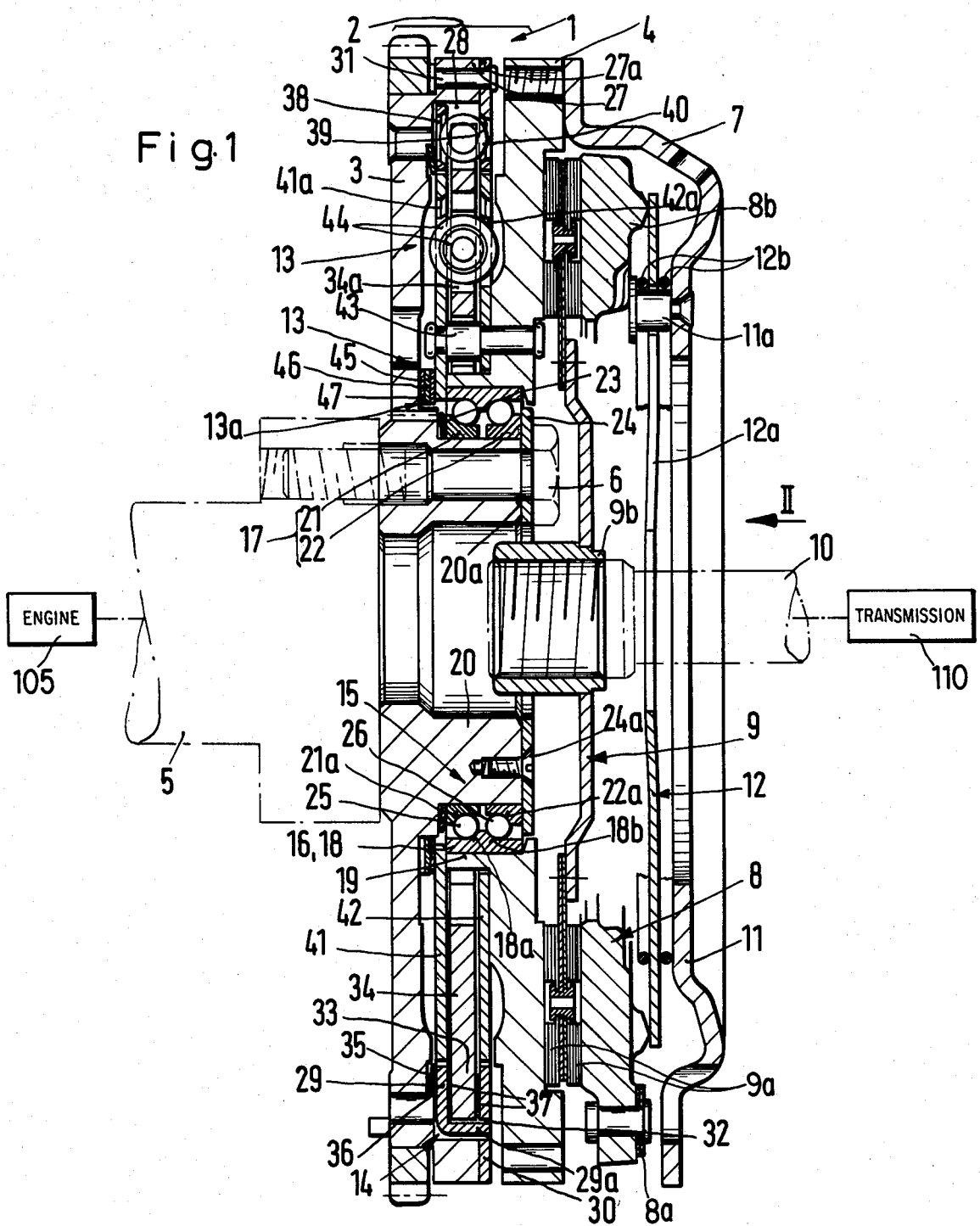
FIG. 1 is a substantially axial sectional view of a torsion damping assembly which embodies one form of the invention and comprises a bearing device with two rows of spherical rolling elements and a split inner race whose left-hand section is biased by a diaphragm spring.
Figure 2:
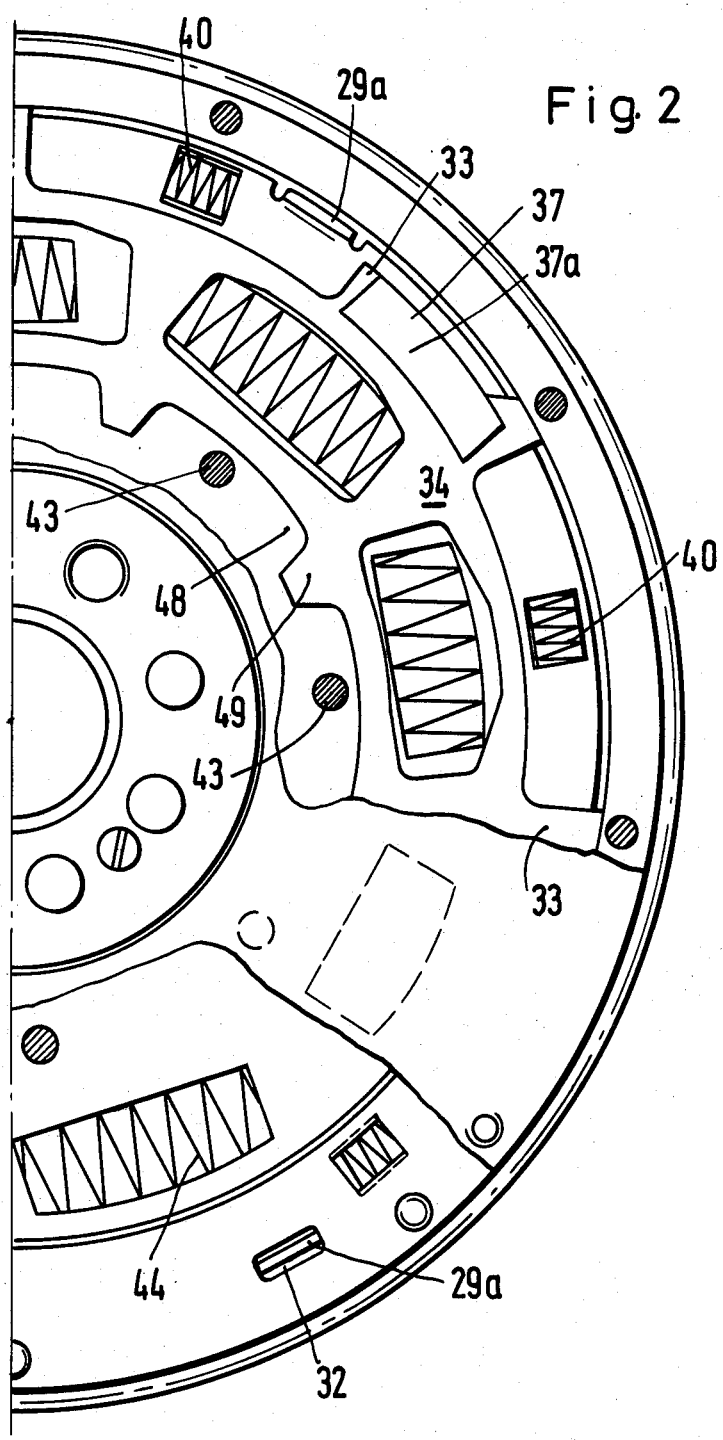
FIG. 2 is a fragmentary end elevational view as seen in the direction of arrow II in FIG. 1.

The torsion damping assembly 1 which is shown in FIGS. 1 and 2 is installed between the crankshaft 5 of the internal combustion engine 105 and the input shaft 10 of the change-speed transmission 110 in a motor vehicle. The assembly 1 comprises a composite flywheel 2 including two coaxial flywheels 3 and 4. The flywheel 3 is secured to the crankshaft 5 by an annulus of bolts 6 or other suitable fasteners, and the flywheel 4 transmits torque to the input shaft 10 through the medium of a friction clutch 7 when the clutch is engaged. The cover or housing 11 of the friction clutch 7 is secured to and rotates with the flywheel 4 which constitutes the axially fixed pressure plate of the clutch. The other pressure plate 8 of the friction clutch 7 is axially movably secured to the cover 11 and/or flywheel 4 by a set of substantially tangentially extending leaf springs 8a and is normally biased against the adjacent friction lining 9a of a clutch disc 9 by a diaphragm spring 12. The other friction lining 9a of the clutch disc 9 then bears against the flywheel 4 and the hub 9b of the disc 9 transmits torque to the shaft 10 through the medium of an annulus of axially parallel internal keys extending into complementary splines at the exterior of the adjacent portion of the shaft 10. The diaphragm spring 12 includes a radially outermost main section which normally bears against the adjacent projections 8b of the pressure plate 8 and radially inwardly extending prongs 12a which can be engaged and shifted in the axial direction of the flywheels 3, 4 by a bearing or by other suitable clutch actuating means, not shown. At such time, the diaphragm spring 12 is tilted between two ring-shaped seats 12b which are held on the cover 11 by a set of rivets 11a.

The flywheels 3 and 4 are angularly movable relative to each other within limits which are imposed by a composite damping unit including a damper 13 and a slip clutch 14 which is in series with the damper 13.

The assembly 1 further comprises a bearing device 15 which is interposed between the flywheels 3 and 4 and includes an angular contact antifriction ball bearing 16 including two annuli or rows of spherical rolling elements 25 and 26. The bearing 16 further comprises a one-piece outer race 18 and a two-piece inner race 17 including coaxial ring-shaped portions or sections 21 and 22. The outer race 18 is installed in a centrally located recess or bore 19 of the flywheel 4 and the sections 21, 22 of the inner race 17 surround a centrally located protuberance 20 which forms an integral part of the flywheel 3 and extends into the recess 19. The protuberance 20 extends axially beyond that side of the major portion of the flywheel 3 which faces away from the crankshaft 5 of the engine 105.

In accordance with a feature of the invention, any play between the two annuli of the rolling elements 25, 26 and the races 17, 18 is eliminated by an energy storing biasing device 23 in the form of a diaphragm spring which forms part of the bearing device 15 and reacts against the adjacent shoulder of the flywheel 3 to bear against the adjacent end face of the section 21 and to thus urge the latter against the rolling elements 25 which, in turn, bear against the outer race 18 to urge the latter against the rolling elements 26 which, in turn, urge the section 22 against a disc-shaped retainer 24 affixed to the end face 20a of the protuberance 20 by a set of screws 24a or analogous securing means. The retainer 24 extends radially outwardly beyond the peripheral surface of the protuberance 20 so that it can limit the extent of rightward axial movement of the section 22 of the inner race 17 (as viewed in FIG. 1). As can be seen in FIG. 1, the radially outermost portion of the diaphragm spring 23 bears againt the aforementioned shoulder of the flywheel 3 and the radially innermost portion of the spring 23 bears against the adjacent end face of the ring-shaped section 21 close to the periphery of the protuberance 20.

The diaphragm spring 23 enables the antifriction bearing 16 to act as a radial as well as an axial (thrust) bearing, and such spring effectively eliminates any play between the rolling elements 25, 26 on the one hand and the races 17, 18 on the other hand. The rolling elements 25 are confined between the tracks 18a, 21a (defined by the race 18 and ring-shaped section 21), and the rolling elements 26 are confined between the tracks 18b, 22a which are respectively defined by the race 18 and ring-shaped section 22.

In order to ensure that the diaphragm spring 23 can hold the rolling elements 25, 26 against any stray movements during engagement and/or disengagement (actuation) of the friction clutch 7, the bias of the spring 23 upon the ring-shaped section 21 exceeds the maximum force which is required for actuation of the clutch 7.

The ring-shaped sections 21 and 22 of the inner race 17 are preferably a press fit or a transition fit on the protuberance 20 of the flywheel 3. This ensures highly accurate guidance and centering of the flywheels 3 and 4. The fit between the section 21 (which is directly engaged by the prestressed diaphragm spring 23) and the protuberance 20 is such that the section 21 is movable axially of the flywheels 3, 4 under the action of the diaphragm spring 23. This enables the section 21 to eliminate any play between the annuli of rolling elements 25, 26 and the races 17, 18 of the bearing 16.

The radially outermost portion or rim 17 of the flywheel 3 surrounds an annular chamber 28 which receives at least the major part of the damper 13 and preferably also at least the major part of the slip clutch 14. The input element of the slip clutch 14 includes two coaxial washer-like discs 29, 30 which share all angular movements of the flywheel 3 relative to the flywheel 4. The disc 30 is secured to the adjacent end face 27a of the rim 27 by a set of rivets 31 and includes radially inwardly extending portions which constitute the right-hand boundary for the chamber 28. The disc 29 is located in the chamber 28 and its radially outermost portion has axially extending projections or lugs 29a which are received in complementary apertures 32 of the disc 30 so that the disc 29 is movable (within limits) axially of the flywheel 3 but cannot rotate relative thereto because it is held against such angular movement by the surfaces surrounding the apertures 32 of the disc 30 which is rigidly affixed to the flywheel 3 by the rivets 31.

The output element of the slip clutch 14 is a flange 34 having radially outwardly extending arms 33 which are received between the discs 29, 30. An energy storing device in the form of a diaphragm spring 35 reacts against the flywheel 3 and biases the disc 29 axially toward the disc 30 so that the discs 29 and 30 clamp the arms 33 therebetween and oppose rotation of the flange 34 relative to the flywheel 3. The arrangement is such that the radially outermost portion of the diaphragm spring 35 bears against the flywheel 3 and the radially innermost portion of the spring 35 bears against the adjacent side of the axially movable disc 29. The means for holding the diaphragm spring 35 against radial movement includes a circumferentially extending shoulder 36 which is machined into the right-hand side of the flywheel 3, as viewed in FIG. 1, and surrounds at least the major portion of the spring 35. A friction generating device 37 includes pads 37a which are interposed between the discs 29, 30 and the respective sides of the arms 33 on the flange 34. The pads 37a can be glued or otherwise bonded to the respective sides of the arms 33.

The discs 29, 30 are respectively formed with registering windows, 38, 39 which alternate with the arms 33 of the flange 34, as considered in the circumferential direction of the flange 34, and each pair of registering windows 38, 39 receives a portion of an energy storing element in the form of a coil spring 40. The coil springs 40 constitute stops for the arms 34 and thus determine the effectiveness of the slip clutch 14, i.e., they determine that extent of angular movement of the flywheels 3, 4 relative to each other during which the friction pads 37a resist rotation of the two flywheels relative to one another. Once the springs 40 are fully compressed by the adjacent edge faces in the corresponding windows 38, 39 on the one hand and by the corresponding arms 33 on the other hand, the arms 34 cannot change their angular positions relative to the discs 29, 30 and/or vice versa (except, of course in a direction to relax the bias upon the springs 40).

The flange 34 not only constitutes the output element of the slip clutch 14 but also the input element of the damper 13 which, as stated before, is in series with the slip clutch. The output element of the damper 13 comprises two discs 41, 42 which are disposed at the opposite sides of the flange 34 and are respectively coplanar or substantially coplanar with and surrounded by the discs 29, 30 of the slip clutch 14. The discs 41, 42 are held at a fixed axial distance from one another by a set of distancing elements in the form of rivets 43 which are anchored in the flywheel 4 so that the discs 41, 42 are compelled to share all angular movements of the flywheel 4 relative to the flywheel 3. The flange 34 is formed with windows 34a which are located radially inwardly of the arms 33 and register with windows 41a, 42a which are respectively provided in the discs 41 and 42. The registering windows 34a, 41a, 42a receive energy storing elements in the form of coil springs 44 which are or can be installed in prestressed condition to oppose angular movements of the flywheels 3, 4 relative to each other, i.e., to oppose angular movements of the flange 34 relative to the discs 41, 42.

The damper 13 further comprises a friction generating unit 13a which is designed to yieldably oppose each and every stage of angular movement of the flywheels 3 and 4 relative to each other. The unit 13a is installed between the disc 41 and the flywheel 3 and comprises an energy storing element 45 in the form of a diaphragm spring. The latter is installed in prestressed condition between the disc 42 of the damper 13 and a pressure-applying ring 46 which is in contact with the flange 34. A friction generating ring 47 is installed between the ring 46 and the adjacent side of the flywheel 3. The forces which are generated and applied by the diaphragm spring 45 are taken up by the bearing 16.

The innermost portion of the flange 34 is formed with recesses or cutouts 48 which are open toward the common axis of the flywheels 3, 4 and each of which receives a portion of a discrete distancing element 43. The recesses 48 alternate with teeth 49, i.e., the teeth 49 alternate with the distancing elements 43 and cooperate with such distancing elements to limit the angle of effectiveness of the damper 13.

It has been found that the useful life of the antifriction bearing 16 is a multiple of the useful life of antifriction bearings which are used in heretofore known torsion damping assemblies wherein several coaxial flywheels are rotatable within limits relative to one another against the opposition of one or more dampers. Such longer useful life of the bearing 16 is attributable to its self-aligning or self-adjusting feature, i.e., that the bearing can compensate for machining tolerances, for tolerances which develop during assembly as well as for wear upon the parts which are caused or allowed to move relative to each other. The diaphragm spring 23 effectively eliminates any play between the races 17, 18 and the rolling elements 25, 26. The flywheels 3 and 4 cannot perform any undamped radial and/or axial movements relative to each other, and the same holds true for the races and rolling elements of the antifriction bearing 16. This prevents hammering, i.e., sudden and pronounced impingement of component parts of the bearing 16 against each other which, in turn, greatly reduces the wear upon the races and the rolling elements with attendant extension of the useful life of the bearing and highly accurate centering of the flywheels 3 and 4.

The reason for hammering (in the absence of any measures to prevent such stray movements of the races and/or rolling elements relative to each other) is believed to be that the crankshaft 5 is slightly flexed during ignition of combustible mixture in the engine whereby the crankshaft imparts to the corresponding flywheel (3) a radial stray movement (which could be called ambling) as well as a wobbling movement. Each of these stray movements is transmitted to the other flywheel (4), and such rapidly recurring movements causes the parts of the antifriction bearing in a conventional torsion damping assembly to move relative to one another with attendant pronounced and rapid wear upon the races. In the absence of remedial measures, the just described deviations of movement of the flywheels from a movement about an ideal or theoretical axis, as well as the inertia of the flywheels, entail the application of alternating moments as well as radial forces to the races of the antifriction bearing between the flywheels. The provision of a bearing device which, in addition to the antifriction bearing, further comprises means (diaphragm spring 23) for biasing at least a portion of at least one of the races 17, 18 axially of the flywheels 3 and 4 ensures that, though the axes of rotation of the flywheels 3 and 4 may deviate from the theoretical or ideal axis, the flywheels cannot induce any stray movements between the parts of the antifriction bearing 16 so that the latter remains effective for long periods of continuous or interrupted use. The provision of biasing means in the form of a diaphragm spring which bears axially against the adjacent portion or section 21 of the inner race 17 has been found to ensure highly uniform distribution of stresses to both races (as considered in the circumferential direction of the bearing 16) which reduces the development of excessive localized stresses that would be likely to entail rapid destruction of the races.

In the embodiment of FIGS. 1 and 2, the protuberance 20 constitutes an integral part of the flywheel 3 and extends in a direction away from the crankshaft 5. However, it is equally possible to provide the flywheel 3 with a detachable or separable or separately machined protuberance which is at least partially surrounded by the bearing device 15 or an analogous bearing device that may but need not necessarily include discrete biasing means (such as the diaphragm spring 23) for one or more ring-shaped sections of one or both races of the self-aligning or self-adjusting antifriction bearing.

FIG. 3 shows a portion of a modified torsion damping assembly. All such parts of this assembly which are identical with those of the assembly 1 are denoted by the same reference characters, and all parts which are modified are denoted by three-digit characters. The bearing device 115 distinguishes from the bearing device 15 of FIGS. 1 and 2 in that the diaphragm spring 123 is installed at the other side of the antifriction bearing 116, namely between the retainer 24 and the inner section 22 of the two-piece race 17. The section 21 of the race 17 abuts a shoulder 3a of the flywheel 3. The radially outermost portion of the diaphragm spring 123 reacts against the retainer 24 and its radially innermost portion bears against the radially innermost part of the section 22 to urge the annulus of rolling elements 26 against the one-piece outer race 18 which, in turn, urges the annulus of rolling elements 25 against the section 21 so that the latter is held in continuous contact with the shoulder 3a of the flywheel 3. The direction in which the diaphragm spring 123 acts upon the components of the antifriction bearing 116 is the same in which the tips of the prongs 12a of the diaphragm spring 12 must be shifted in order to disengage the friction clutch 7. Consequently, the diaphragm spring 123 need not take up the stresses which develop when a bearing or the like is moved axially of the flywheels 3, 4 in order to disengage the friction clutch 7, i.e., to interrupt the transmission of torque from the flywheel 4 to the input shaft 10 of the change-speed transmission in a motor vehicle. Such stresses are taken up by the outer race 18 (they are transmitted thereto by the flywheel 4) and are transmitted to the shoulder 3a of the flywheel 3 by way of the annulus of rolling elements 25 and section 21 of the two-piece inner race 17. In other words, the forces which are applied during disengagement of the clutch 7 are not transmitted to the diaphragm spring 123.

FIG. 4 illustrates a portion of a third torsion damping assembly which comprises a bearing device 215 including an angular contact antifriction bearing 216 with two annuli of spherical rolling elements 25, 26 between a one-piece inner race 217 and an outer race 218 composed of two ring-shaped portions or sections 221, 222. The outer race 218 is installed in the recess or bore 19 of the flywheel 4, and the inner race 217 is mounted on the protuberance 20 of the flywheel 3. The diaphragm spring 223 of the bearing device 215 reacts against a shoulder 4a of the flywheel 4 and bears against the section 222 of the outer race 218 so that the second 222 tends to move axially toward the section 221 and eliminates any play in the antifriction bearing 216. The section 221 bears against the radially innermost portion of the disc 41 which is secured to the flywheel 4 by the distancing elements 43.

In the embodiment of FIG. 4, the diaphragm spring 223 must take up the stresses which develop when the friction clutch 7 between the flywheel 4 and the input shaft 10 of the change-speed transmission is acted by moving the tips of the prongs 12a in a direction to the left. If desired, such stressing of the diaphragm spring 223 can be avoided by mounting the latter between the disc 41 and the section 221 of the outer race 218.

The main difference between the bearing device 215 and the bearing devices 5, 115 is that the antifriction bearing 216 comprises a split outer race 218 whereas the bearings 16 and 116 comprise split inner races. The diaphragm spring 23, 123 or 223 of the respective bearing device 15, 115 or 215 need not necessarily react against the flywheel 3 or 4, i.e., it can react against any axially fixed part of the torsion damping assembly.

Referring now to FIG. 5, there is shown a torsion damping assembly with a bearing device 315 which includes a so-called four-point bearing 316. The latter comprises a two-piece inner race 317 with a first ring-shaped section 321 and a second ring-shaped section 322. The radially innermost portion of a diaphragm spring 323 bears against the section 321 and the radially outermost portion of this spring reacts against the adjacent shoulder of the flywheel 3. The spring 323 causes each of the single annulus of rolling elements 325 of the antifriction bearing 316 to be in contact with the points 318a, 318b of the outer race 318 and with the points 321a, 322a of the respective sections 321, 322 of the inner race 317.

In order to ensure that the rolling elements 325 will remain in requisite contact with the races 317, 318 during actuation of the friction clutch 7, the diaphragm spring 323 must be dimensioned and prestressed in such a way that it bears against the section 321 with a force which exceeds the force that is necessary to actuate the friction clutch. Furthermore, and in order to ensure that the diaphragm spring 323 need not oppose actuation of the friction clutch 7, this spring can be installed at the other side of the bearing 316, namely between the section 322 of the inner race 317 and a shoulder of the protuberance 20 so as to urge the section 322 toward the section 321 and to thereby continuously maintain each rolling element 325 in four-point contact with the races 317, 318.

It is also within the purview of the invention to split the outer race 318 in addition to or in lieu of the inner race 317 and to equip the bearing device 315 with a diaphragm spring or with other suitable means for biasing one or both sections of the split outer race toward the rolling elements 325.

Referring to FIG. 6, there is shown a portion of a further torsion damping assembly wherein the bearing device 415 comprises a so-called wire bearing 416 which is or can be said to constitute a functional equivalent of the four-point bearing 316 of FIG. 5. The wire bearing 416 comprises a single annulus of spherical rolling elements 425 between four annular wire-like sections 418a, 418b and 421, 422. The sections 418a, 418b constitute a two-piece outer race and the sections 421, 422 constitute a two-piece inner race. The section 422 is biased by the radially innermost portion of a diaphragm spring 423 which reacts against a shoulder of the flywheel 4 and urges the section 422 against the rolling elements 425 which are thereby held in continuous contact with the sections 418a, 418b and 421. In order to allow the wire bearing 416 to compensate for wear and/or to compensate for eventual machining or assembling tolerances, at least one of the sections 418a, 418b, 421, 422 (preferably the section 422) constitutes a split ring.

It is clear that the diaphragm spring 423 can be replaced with an energy storing device which bears against the section 418a, 418b or 421 without departing from the spirit of the invention. Furthermore, the bearing device including the wire bearing 416 can comprise means for biasing two or more ring-shaped sections axially of the flywheels 3, 4 to thereby even more reliably prevent any stray movements of such sections relative to each other and/or relative to the annulus of rolling elements 425.

The wire bearing 416 can be used with particular advantage when the torsion damping assembly provides little room for installation of the bearing device.

In accordance with an additional feature of the invention which is not specifically shown in the drawing, the bearing device need not be provided with a discrete diaphragm spring or any other means for biasing at least a portion or section of the one and/or the other race axially toward the adjacent rolling elements of the antifriction bearing. Thus, at least one of the races (or at least one portion or section of at least one of the races) can be mounted in the torsion damping assembly in such a way that it bears against the adjacent rolling elements with a force which suffices to guarantee the elimination of play between the races and the rolling elements in spite of the absence of any discrete resilient biasing means. At least one of the races (or at least one ring-shaped portion or section of at least one of the races) is elastically stressed during assembly of the bearing device in such a way that it can ensure the elimination of any clearance or play between the races and the rolling elements. Such self-aligning or self-adjusting bearing devices preferably (but not necessarily) comprise several annuli or rows of rolling elements with one-piece inner and/or outer races because such races are necessarily wider than the races of an antifriction bearing with a single annulus of rolling elements so that the relatively wide race or races can store large amounts of energy during installation to reliably prevent the development of any clearances, even in the total absence of discrete biasing means.

The aforediscussed mounting of the axially movable (biased or energy-storing) race or races, or of the axially movable section or sections of one or both races, in such a way that the axially movable race or section is a press fit or a transition fit on or in the respective flywheel ensures highly accurate guidance and centering of the two flywheels.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A damping assembly, particularly for taking up and compensating for fluctuations in the transmission of torque between the internal combustion engine and the change-speed transmission of a motor vehicle, comprising a plurality of coaxial flywheels which are rotable within limits relative to each other and include a first flywheel arranged to receive torque from the engine and a second flywheel arranged to transmit torque to the transmission; damper means arranged to yieldably oppose rotation of said first and second flywheels relative to each other; and a bearing device interposed between said first and second flywheels and including at least one self-adjusting antifriction bearing.

2. The assembly of claim 1, wherein said antifriction bearing includes a plurality of coaxial races and said bearing device further includes means for biasing at least a portion of at least one of said races axially of said flywheels.

3. The assembly of claim 2, wherein said antifriction bearing further comprises at least one annulus of rolling elements between said races and said biasing means includes for yieldably urging said portion of said one race against said rolling elements.

4. The assembly of claim 3, wherein said antifriction bearing is an angular bearing and comprises several annuli of rolling elements, at least one of said races comprising a plurality of coaxial ring-shaped sections.

5. The assembly of claim 3, wherein said one race is surrounded by the other of said races and said biasing means includes resilient means for urging one of said sections axially against one annulus of said rolling elements.

6. The assembly of claim 3, wherein said one race surrounds the other of said races and said biasing means includes resilient means for urging one of said sections axially against said rolling elements.

7. The assembly of claim 1, wherein said antifriction bearing includes a wire bearing including an annulus of rolling elements, a first race including two coaxial rings in contact with said rolling elements and a second race including two coaxial rings in contact with said rolling elements, said bearing device further comprising means for biasing at least one of said rings axially against said rolling elements.

8. The assembly of claim 7, wherein said one ring forms part of said first race and said second race surrounds said first race.

9. The assembly of claim 7, wherein said one ring forms part of said first race and said second race is surrounded by said first race.

10. The assembly of claim 1, wherein said antifriction bearing includes a four-point bearing including a first race, a second race and an annulus of rolling elements between said races, at least one of said races including a plurality of coaxial ring-shaped sections and said bearing device further comprising means for biasing one section of said one race axially toward said rolling elements.

11. The assembly of claim 10, wherein said one race is surrounded by the other of said races.

12. The assembly of claim 10, wherein said one race surrounds the other of said races.

13. The assembly of claim 1, wherein said antifriction bearing comprises at least one annulus of rolling elements, a first race for said rolling elements and a second race for said rolling elements, at least one of said races being arranged to bear axially against said rolling elements to thereby urge such rolling elements against the other of said races.

14. The assembly of claim 1, further comprising a friction clutch arranged to transmit torque from said second flywheel to the transmission, said clutch being disengageable in response to the application thereto of a force acting in a predetermined direction axially of said flywheels, said antifriction bearing including at least one annulus of rolling elements, a first race for said rolling elements and a second race for said rolling elements, said bearing device further comprising means for biasing at least a portion of at least one of said races against said rolling elements in said predetermined direction.

15. The assembly of claim 14, wherein the force which said biasing means applies to said portion of said one race is between one and three times the maximum force which is required to disengage said clutch.

16. The assembly of claim 1, further comprising a friction clutch arranged to transmit torque from said second flywheel to the transmission, said clutch being disengageable in response to the application thereto of a force acting in a predetermined direction axially of said flywheels, said antifriction bearing having at least one annulus of rolling elements, a first race for said rolling elements and a second race for said rolling elements, said bearing device further including means for biasing at least a portion of at least one of said races against said rolling elements counter to said predetermined direction.

17. The assembly of claim 16, wherein the force which said biasing means applies to said portion of said one race is between one and three times the maximum force which is required to disengage said clutch.

18. The assembly of claim 1, wherein said antifriction bearing has at least one annulus of rolling elements, a first race for said rolling elements and a second race for said rolling elements, said bearing device further comprising means for biasing at least a portion of at least one of said races axially of said flywheels and against said rolling elements, said portion of said one race being a press fit in or on one of said first and second flywheels.

19. The assembly of claim 1, wherein said antifriction bearing has at least one annulus of rolling elements, a first race for said rolling elements and a second race for said rolling elements, said bearing device further comprising means for biasing at least a portion of at least one of said races axially of said flywheels and against said rolling elements, said portion of said one race being a transition fit on one of said first and second flywheels.

20. The assembly of claim 1, wherein said first flywheel includes a centrally disposed protuberance facing away from the engine and said bearing device is mounted on said protuberance.

21. The assembly of claim 20, wherein said protuberance is an integral part of said first flywheel.

22. The assembly of claim 1, wherein one of said first and second flywheels comprises a centrally located protuberance and said bearing device surrounds said protuberance, said antifriction bearing including at least one annulus of rolling elements, a first race for said rolling elements and a second race for said rolling elements, said bearing device further comprising a diaphragm spring reacting against one of said flywheels and bearing against one of said races to urge at least a portion of such one race against said rolling elements.

23. The assembly of claim 22, wherein said one flywheel is said first flywheel and said antifriction bearing comprises several coaxial annuli of rolling elements, said one race being surrounded by the other of said races and including several coaxial ring-shaped sections, said diaphragm spring including a first portion which reacts against said first flywheel and a second portion disposed radially inwardly of said first portion and bearing against one of said sections to urge such one section axially against the rolling elements of one of said annuli.

24. The assembly of claim 1, wherein said second flywheel has a centrally located recess and said antifriction bearing has at least one annulus of rolling elements, an outer race for said rolling elements and an inner race for said rolling elements, said outer race being installed in said recess and said bearing device further comprising means for biasing at least a portion of at least one of said races axially against said rolling elements.

* * * * *

UNITED STATES PATENT AND TRADEMARK OFFICE
CERTIFICATE OF CORRECTION

PATENT NO. : 4,611,701
DATED : September 16, 1986
INVENTOR(S) : Oswald FRIEDMANN It is certified that error appears in the above-identified patent and that said Letters Patent are hereby corrected as shown below:

Col. 1, lines 30-31, after "centers" delete "of".
Col. 4, line 32, "ebodiments" should read --embodiments--.
Col. 6, line 28, "17" should read --27--.
Col. 9, line 49, "second" should read --section--.
Col. 11, line 55, "rotable" should read --rotatable--.
Col. 12, line 4, after "includes" insert --means--.

Signed and Sealed this

Seventeenth Day of February, 1987

Attest:

DONALD J. QUIGG

*Attesting Officer*   *Commissioner of Patents and Trademarks*

UNITED STATES PATENT AND TRADEMARK OFFICE
CERTIFICATE OF CORRECTION

PATENT NO. : 4,611,701
DATED : September 16, 1986
INVENTOR(S) : Oswald FRIEDMANN It is certified that error appears in the above-identified patent and that said Letters Patent are hereby corrected as shown below:

Col. 11, line 56 (line 6 of claim 1) - the words "within limits" should be deleted;

Col. 11, line 61 (line 11 of claim 1) - the words --so that the flywheels are rotatable within limits relative to each other-- should be inserted after "other" (but before the semicolon).

Signed and Sealed this

Second Day of February, 1988

Attest:

DONALD J. QUIGG

Attesting Officer

Commissioner of Patents and Trademarks